(12) United States Patent
Frishberg

(10) Patent No.: US 7,994,651 B2
(45) Date of Patent: Aug. 9, 2011

(54) APPARATUS FOR CONVERTING THE ENERGY OF WAVES ON A BODY OF WATER

(76) Inventor: Dov Frishberg, New York, NY (US)

( * ) Notice: Subject to any disclaimer, the term of this patent is extended or adjusted under 35 U.S.C. 154(b) by 0 days.

(21) Appl. No.: 12/891,093

(22) Filed: Sep. 27, 2010

(65) Prior Publication Data

US 2011/0163547 A1  Jul. 7, 2011

(51) Int. Cl.
*F03B 13/14* (2006.01)
(52) U.S. Cl. .......................... 290/53; 60/495
(58) Field of Classification Search .................. 290/52; 60/495, 497, 500
See application file for complete search history.

(56) References Cited

U.S. PATENT DOCUMENTS

| | | | |
|---|---|---|---|
| 562,317 A | 6/1896 | Martin | |
| 3,994,134 A * | 11/1976 | Molnar | 60/496 |
| RE31,111 E | 12/1982 | Hagen | |
| 4,781,023 A | 11/1988 | Gordon | |
| 6,864,592 B1 | 3/2005 | Kelly | |
| 7,180,203 B2 * | 2/2007 | Mozafari | 290/53 |
| 7,310,944 B2 * | 12/2007 | Sabol et al. | 60/495 |
| 7,456,512 B2 | 11/2008 | Nadel | |
| 7,908,854 B2 * | 3/2011 | Raikamo et al. | 60/498 |
| 2006/0208494 A1 * | 9/2006 | Cook | 290/53 |
| 2007/0089409 A1 * | 4/2007 | Serrano Molina | 60/504 |
| 2007/0164568 A1 | 7/2007 | Greenspan et al. | |
| 2008/0018113 A1 * | 1/2008 | Tal-or | 290/53 |
| 2009/0015013 A1 | 1/2009 | Jaer | |
| 2009/0056327 A1 | 3/2009 | Raikamo et al. | |
| 2010/0012415 A1 | 1/2010 | Hedtke | |
| 2010/0225116 A1 * | 9/2010 | Cuong | 290/53 |

FOREIGN PATENT DOCUMENTS

| | | |
|---|---|---|
| FR | 524.467 | 9/1921 |
| GB | 2210667 A * | 6/1989 |
| GB | 2248689 A * | 4/1992 |
| GB | 2262572 A * | 6/1993 |
| GB | 2 434 620 | 8/2007 |
| JP | 2002-332946 | 11/2002 |
| JP | 2006-233948 | 9/2006 |
| WO | WO 9415095 A1 * | 7/1994 |

OTHER PUBLICATIONS

T.W. Thorpe "A Brief Review of Wave Energy", A Report produced for The UK Department of Trade and Industry in May 1999, Serial No. ETSU-R120.

* cited by examiner

*Primary Examiner* — Joseph Waks
(74) *Attorney, Agent, or Firm* — Greenberg Traurig, LLP

(57) ABSTRACT

An apparatus converting the energy of waves on an open body of water includes a submerged articulated frame or frames formed of rods arranged largely in a parallelogram. The frame or frames are arranged so that as a wave passes the frames, the frames are distorted by having their rods rotate about connecting pivot points and so move toward and away (as well as relative to) from each other. This movement is then converted into energy. In alternate embodiments, multiple interconnected frames are provided, each pivoting in a respective plane.

20 Claims, 9 Drawing Sheets

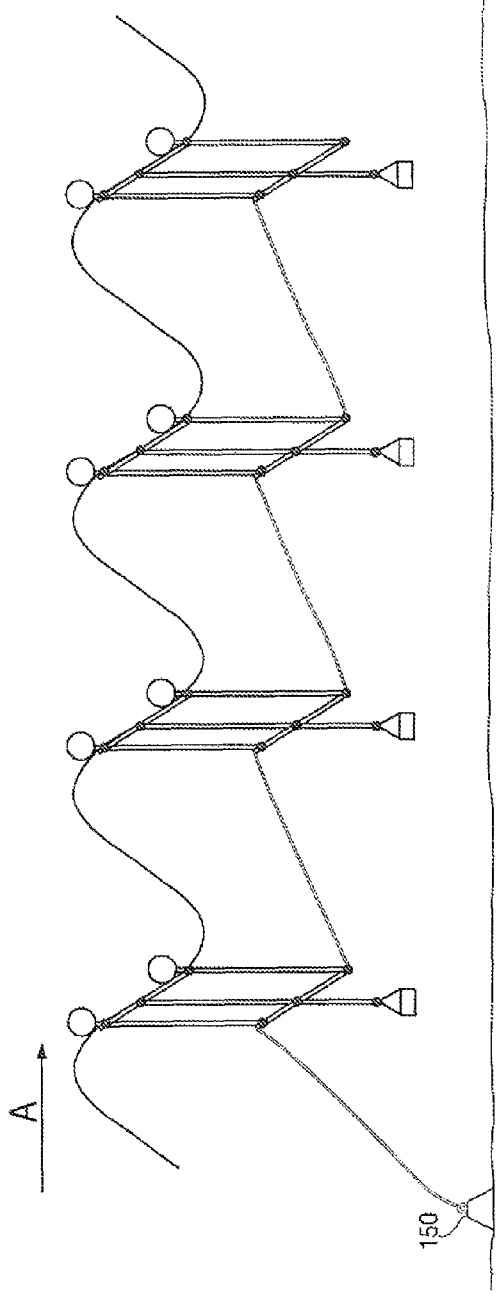
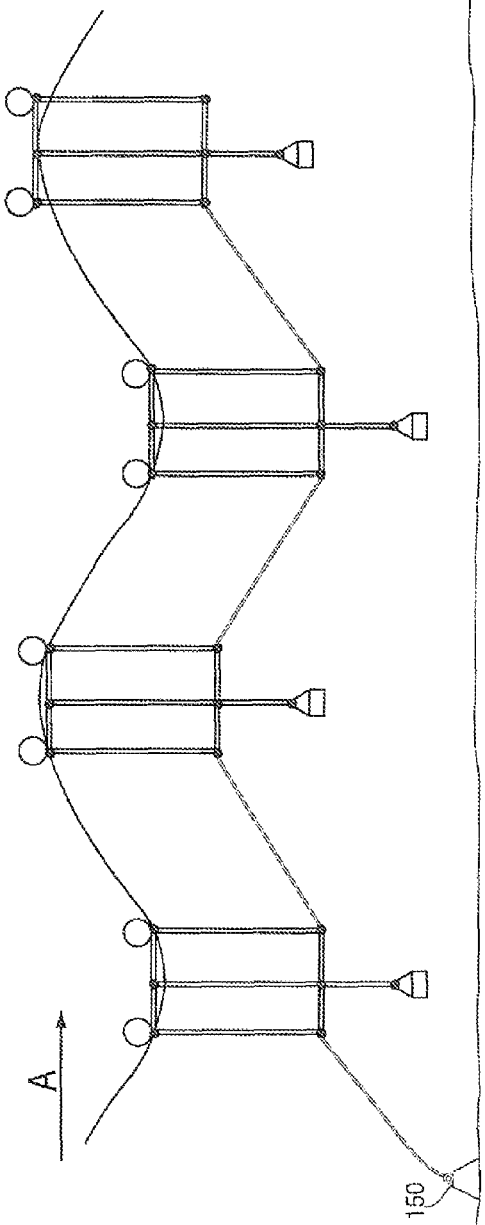

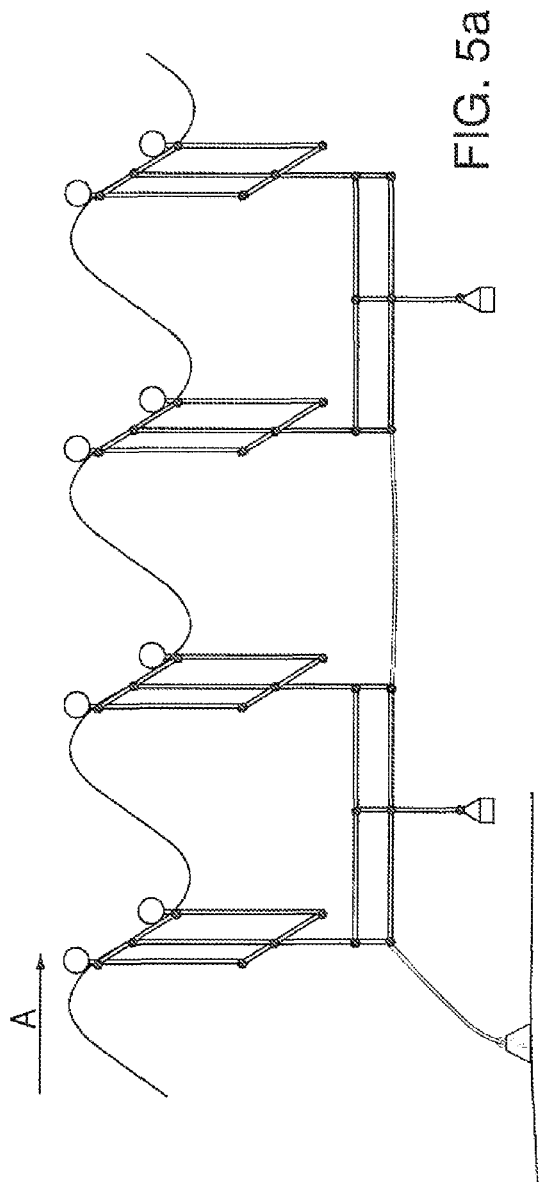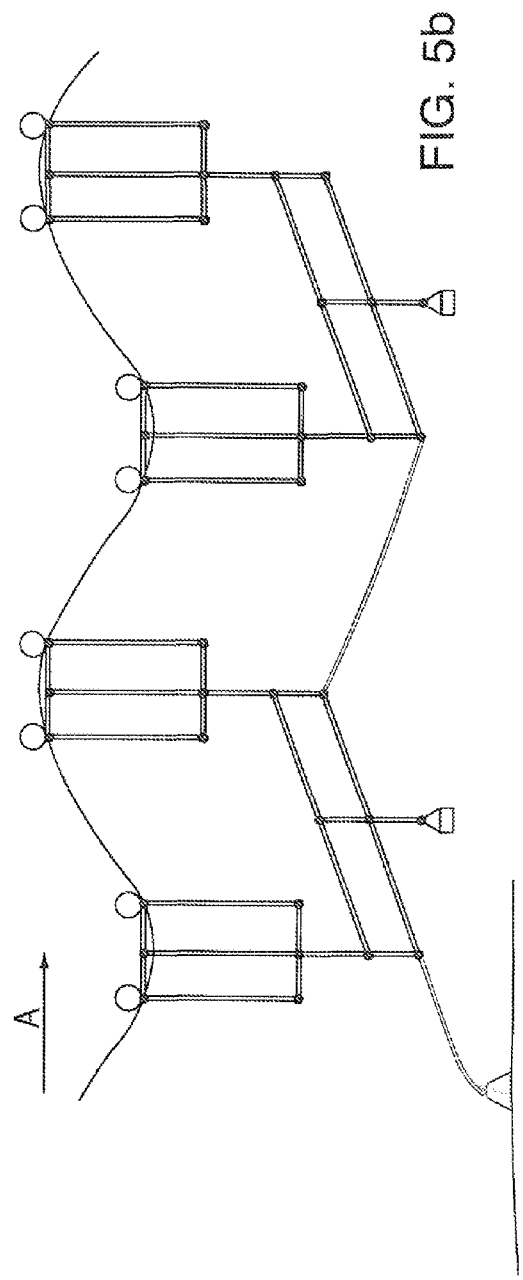

APPARATUS FOR CONVERTING THE ENERGY OF WAVES ON A BODY OF WATER

RELATED APPLICATIONS

None

BACKGROUND OF THE INVENTION

A. Field of Invention

This invention pertains to an apparatus for converting the energy of waves found on large bodies of water into a usable form, e.g., electric energy. The apparatus relies on a novel device for capturing the energy of chaotic wave motion and using this energy to drive an electric generator or any other energy capturing and collecting process.

B. Description of the Prior Art

Dating back to the dawn of the industrial revolution and through most of the twentieth century, energy-related policy decisions were all based on the assumption that the supply of fossil fuels was virtually unlimited and that cheap and reliable energy from these fuels will always be available. However starting in the 1970's, decision makers were shocked to learn that the supply of fossil fuels could be restricted, thereby raising the price of these fuels. Moreover, at about the same time, reputable scientists started to agree that the supply of fossil fuels was limited and that the world will run out of a readily available supply of these fuels in the foreseeable future. As a result, many organizations started looking for alternative, preferably renewable, energy sources.

Over the years, many different approaches to the problem of renewable energy have been tried. The majority of these approaches are suited for certain geographic locations and circumstances. Some approaches include the use of solar panels, wind mills, geothermal generators, etc.

One intriguing approach that has captured the minds of many inventors is the energy of waves on large bodies of water. Schemes going back as far as 1896 (see U.S. Pat. No. 562,317), and probably even earlier, have been conceived for harnessing this energy. However, these schemes have been unsuccessful for several reasons. One reason is that they are very complicated and are prone to frequent mechanical failures and prolonged outages. Of course, if the devices break down frequently and are out of commission, they cannot produce energy and are uneconomical. The above-mentioned U.S. Pat. No. 562,317, as well as the more recent U.S. Patent Publication 2007/0164568 provide two examples of such complicated mechanisms.

Another disadvantage common to many previous schemes is that they use a simple floating object, such as buoy. However, waves are not merely elevational and directional changes in water level, but are in fact very complicated three-dimensional chaotic turbulences characterized by water flowing in many directions and at different velocities. A device moving up and down with each wave only captures a small portion of the wave's energy. Some simple floating devices capture some of the movement beyond the change in elevation, but to a limited amount. Accordingly, any energy converting device relying only on the movement of a floating device is inherently inefficient.

Other schemes use a plurality of large elongated objects such as pipes, or planar objects, employing plates disposed end-to-end and floating on the water. One such scheme is discussed in U.S. Pat. No. Re 31,111. In this reference, plates of different longitudinal lengths are used to accommodate waves of different heights and periods. Complicated joints are placed between the plates and a working fluid (e.g., water) is fed from one plate to another using a complicated set of one-way valves as waves pass the objects. The flow of fluid is converted by generators into electricity.

Other devices are based on additional principles but are equally deficient. In general, more efficient, non-obstructive wave energy converting devices are more likely to see commercial success when placed in remote locations where harsh conditions also create powerful wave motion. Distance from shore minimizes their obstructive nature, while the waters below are deep and conducive to wave motion. Such locations not only physically challenge wave energy converting devices' structure, they are difficult and expensive to reach, anchor, maintain and connect to shore.

SUMMARY OF THE INVENTION

Briefly, the present application pertains to an apparatus having an articulated frame formed of rods attached end-to-end by pivot points to form a parallelogram. At the top of the frame are floating components attached to the frame at or close to certain pivot points and the frame is arranged so that it is normally disposed vertically just below the water surface so that as waves pass the frame, the rods move toward and away from each other as the floating components respond to the motions of waves. A generator is coupled to at least one rod or pivot point or in relation to each other and the motion of the rod or the rods about the pivot point is converted by the generator into electrical energy.

More particularly, an apparatus for generating energy from water waves in accordance with this invention includes an articulate frame having sides forming a parallelogram; one or more buoyant members attached to the frame; an optional weight attached to the frame either directly or via a vertical rod at the center of the frame and cooperating with said buoyant member(s) to keep said frame generally vertical in the water; and a generator or other energy capturing or connecting component coupled to said frame. As waves pass said frame in the water, the frame tends to cyclically angularly distort. The generator or energy capturing component is arranged to convert the cyclical distortion of said frame into electrical energy.

In one aspect of the invention, the frame is formed of two generally vertical rods interconnected by two other rods at end pivoting points so that when the rods are perpendicular at pivoting points the frame takes the form of a rectangle. The buoyant members are connected to each of said end pivoting points at the top of the frame as it is submerged vertically.

In another aspect of the invention, a central rod is disposed generally vertically and connected to an intermediate pivot point on one or two of the other rods. Preferably, the frame includes a first intermediate pivot point and a second intermediate pivot point provided on said other rods respectively and said central rod extends between said intermediate pivot points. Preferably, the central rod extends below said frame as the frame is oriented generally vertically in the water and a stabilizing weight is attached to said central rod at its lowest point to assist the frame in maintaining a general vertical position.

In another aspect of the invention, the central rod and said other rods pivot angularly with respect to each other as said frame is distorted and said generator is coupled between one of said other rods and said central rod to convert their respective pivoting into electrical energy.

In another aspect of the invention, an apparatus converting the motion of water waves into corresponding electrical energy is presented that includes a frame formed of two vertical rods and two other rods, said rods being interconnected at respective pivoting points at their end points to form a parallelogram, said frame being cyclically distorted by having the angles between the rods reciprocate as water waves pass the frame causing the floating components to move in response; and a generator or other energy capturing device arranged to transform the distortion of said frame into useable energy. Preferably a first and second buoyant member and a weight are also included, said buoyant members and said weight cooperating to maintain said frame in a generally vertical position as waves flow pass the frame. Preferably, the apparatus further includes a central rod connected at intermediate pivot points to both or the lower of said other rods, and said weight is coupled to said central rod at its lowest point. Preferably, the generator or another energy capturing device are responsive to cyclical angular changes between said central rod and one of said other rods.

In another aspect of the invention, a composite apparatus for converting wave motion into energy is presented, where the apparatus including a first small articulate frame, a second small articulate frame and a third larger articulate frame, each articulate frame having two vertical and two horizontal rods interconnected at pivoting points and forming parallelograms in a vertical plane, the horizontal rods of the larger frame being much longer than the horizontal rods of the small frames, said small frames being coupled to respective pivot points of said large frame in a manner in which the two vertical rods of the large frame extend upwards and form the central rod, respectively, of each of the small frames as all three interconnected frames are disposed largely vertically submerged in the water. The apparatus further includes at least two buoyant elements attached to each one of said small frames; and a weight attached to said large frame and cooperating with said buoyant element to maintain said articulate frames essentially at or just below the water surface as waves pass the frames. Also included is a generator or other capturing device coupled to at least one of said rods, wherein, waves passing the frames cause the frames to distort by rotating the rods cyclically toward and away from each other.

Preferably the generator is constructed and arranged to convert the cyclical motion of said rods into useable energy. The horizontal rods of the small and larger frames have a length generally optimized to the wavelength of waves typical for the location where the device is to be deployed, where the smaller frames respond more efficiently to smaller waves and the larger frame responds more efficiently to larger waves.

Preferably the generator generates electrical energy.

In an alternate embodiment, two or more frames are provided that are interconnected at their center perpendicularly, stabilizing the frames' tendency to roll relative to the flow direction of the waves while the other frame, disposed perpendicular to the stabilizing frame captures the energy of the waves' yaw motion. The stabilizing frame also articulates to capture any yaw motion perpendicular to the wave motion. As the stabilizing frame is shorter than the primary energy capturing frame, or the combinations thereof, the latter continue to remain parallel to the direction of the wind and the direction of the waves' movement.

BRIEF DESCRIPTION OF THE DRAWINGS

FIGS. 4a and 4b show several independent frames similar to the frames used in the apparatus of FIGS. 1 and 2 and tethered serially to each other;

FIGS. 5a and 5b show multiple frames similar to the frame shown in FIG. 3 and tethered serially to each other;

DETAILED DESCRIPTION OF THE INVENTION

Figure 1:
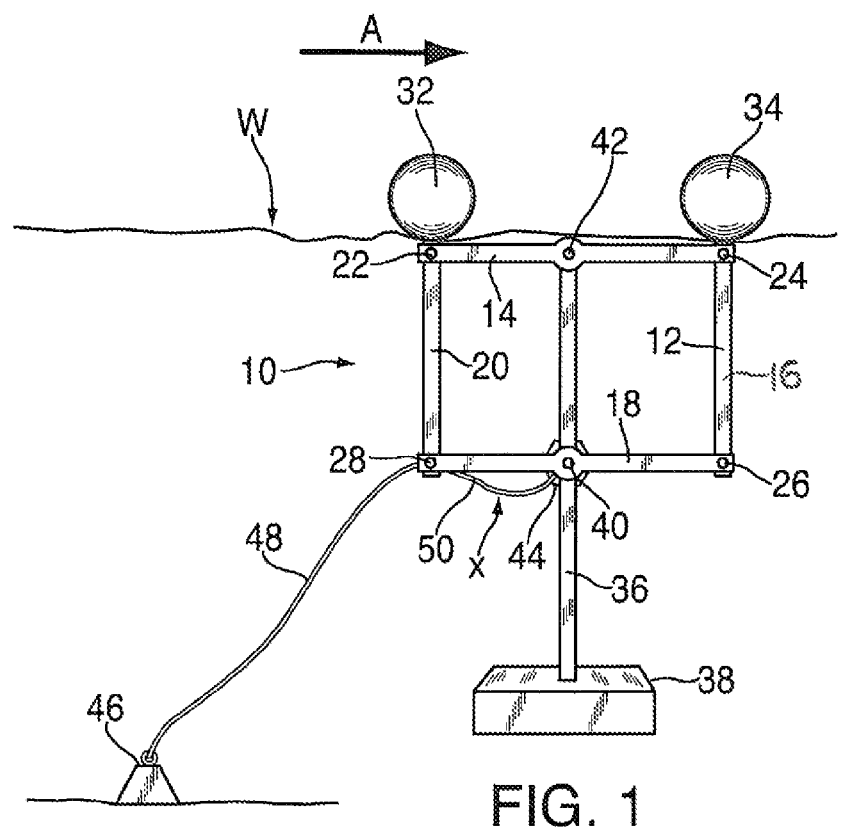
FIG. 1 shows an elevational, somewhat diagrammatic view of an apparatus constructed in accordance with this invention when water is largely at rest.

Referring now to FIG. 1, an apparatus 10 constructed in accordance with this invention includes an articulate frame 12 formed of four straight rods 14, 16, 18 and 20. Preferably, rods 14 and 18 are equal in length to each other and rods 16 and 20 are equal in length to each other. Rods 14, 16, 18 and 20 are connected to each other at end points 22, 24, 26, 28 by appropriate hinges or other conventional means that allow the rods to freely pivot along the same plane with respect to each other about a vertical plane defined by the frame, thereby forming a parallelogram. Attached to corners 22 and 24, there are respective floating spheres 32 and 34. Spheres 32 and 34 can be attached to rods 14, 16 or 20.

Attached to a pivot point 40, located at the middle of rod 18, is a central rod 36 extending downwardly and terminating with a weight 38. Rod 36 further extends upward from rod 18 upward to a pivot point 42 located midway on rod 14. The pivot points 40 and 42 allow rod 36 to rotate or pivot with respect to rods 14 and 18. From an operational view, the section of rod 36 between points 40 and 42 can be omitted. However, from a structural point of view rod 36 with such omission is desirable because it stabilizes frame 12 forcing rods 14, 16, 18 and 20 to be maintained as a vertical parallelogram. Also, by enabling the placing of pivot point 42 the central rod 36 creates a pivot point that is an additional placement location for a generator. Additionally central large waves create motion that tends to dislocate frame 12 with less or limited pivotal motion; an extended rod 36, under such conditions, increases the tendency of rods 16 and 20 to maintain pivoting motion relative to rods 14 and 18.

Rods 14, 16, 18, 20, 36 are either solid or hollow and can be made of a plastic, metal, metal alloy, or combinations of these materials. Further, rods 14, 16, 18, and 36 can be covered with a protective coating (not shown) to protect them from the environment. Moreover, rods 14, 16, 18, 20 and 36 may have a circular, square, rectangular or any other shape cross-section.

Spheres 32 and 34 have a very light weight such that they can float while attached to the whole device 10 at water line W. Since spheres 32 and 34 are exposed to very rough conditions, including wind, rough waves, collisions, salinity etc., they are made of sturdy materials. For example, spheres 32 and 34 may be metal balls filled only with a vacuum, gas or air. Alternatively, they can be made of a light material, such as Styrofoam encased in a protective skin. Further, spheres 32 and 34 may be buoyant members having various shapes including rotating balls or discs that may also be used in capturing the energy from the surface flow movement of the water. Moreover, other kinds of structures, such as a plastic honeycomb, could be used to make the interior of the balls. Weight 38 is made of a heavy resilient material and its purpose is to stabilize in a generally vertical position for 16, 20 and 36 the whole frame 12 as the frame moves with the waves in water.

Device 10 further includes an electric generator 44. Preferably this generator is located at or coupled to pivot point 40. However, generator 44 may also be located at, or coupled to, any other point on frame 12. Moreover, in an alternate embodiment, frame 12 may be provided with more than one generator 44, each located at, or coupled to, a respective point. It should be emphasized that the articulate frames are shown in all the figures somewhat diagrammatically and that well known and conventional elements for implementing the invention have been omitted for the sake of clarity. For example, generator 44 is shown at pivot point 40 because its purpose is to convert the relative rotation between rods 18 and 36 affected at pivot point 40 into electrical energy. Also, one skilled in the art will appreciate that the generator 44 itself need not be actually mounted at the pivot point but could be installed instead at other locations, e.g., on rod 18, rod 36 or connected to additional rods connected to the frame of device 10 and/or rod 36. For example, an upward extension of 36 beyond point 42 and a rod connected to rod 14 allow for placing a generator above the water line W. Conventional means, such as intermeshed gears used in conventional manual drills, are then provided to transmit the rotation or relative movements of the rods to generator 44. Moreover, it should be noted that if generator 44 is on lower sections of rod 36, it augments the weight and functionality of weight 38 and, if large enough, it may even replace the weight 38.

Preferably, frame 12 is tethered to a solid anchor 46 on the sea bottom by a cable 48. The length of cable 48 depends on various factors, including the depth of the sea at a particular location, the expected height of waves, etc. At its opposite end, the cable 48 is attached to the frame 12. In the figures, cable 48 is shown attached at or about the pivot point 28. In another embodiment, the cable 48 may be attached at other locations of the frame as well, such as the pivot point 22, rod 20, etc.

Device 10 operates as follows. FIG. 1 shows device 10 while the sea is relatively level and without substantial wave motion. At this time, the two spheres 32 and 34 are substantially at the same height. The weight 38 pulls the frame 12 down so that, except for the spheres, device 10 is under water. In this position rods 16, 20 and 36 are generally vertical and rods 14 and 18 are generally horizontal. The wind is blowing in direction A causing the spheres generally to align the frame 20 in the same direction as the wind and the waves as shown.

Figure 2:
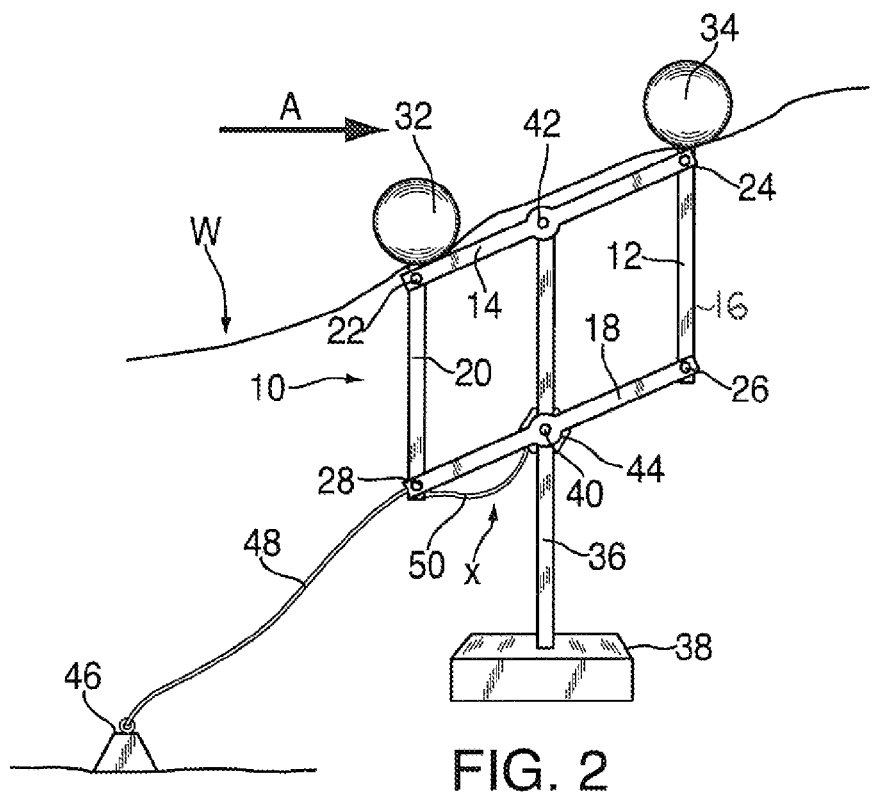
FIG. 2 shows an elevational view of the apparatus of FIG. 1 responding to motions of a wave.

Because of the wind and/or other causes, the water swells up above and below its level in FIG. 1 to generate a wave as shown in FIG. 2. This wave causes sphere 32 to go up and down with respect to sphere 34. It also causes horizontal rods 14, 18 to pivot clockwise and counterclockwise so that the angle between the rods is no longer a right angle. As the wave moves in direction A, sphere 32 begins to move upwards faster than sphere 34. Rod 14 rotates clockwise about 42 when looking at frame 20 from the right relative to the direction of the wind and the waves. As spheres 32 and 34 later find themselves positioned on the downward part of the wave, the clockwise rotation gives way to a counter-clockwise rotation as shown in FIG. 2. Subsequently, the surface W of the receding water moves down (not shown) below its level in FIG. 1 causing sphere 32 to move up towards a level of sphere 34 and rods 14 and 18 pivot in the clockwise rotation. (Since the wave can move fairly fast, the vertical rods may pivot somewhat as well, but they are then quickly returned to their generally vertical orientation by their weight and weight 38). Stops (not shown) may be provided to limit the reciprocating movement and inertia of frame 12 to ensure that the spheres 32 and 34 are not damaged or topple under extreme wind and wave conditions.

Thus, as waves pass device 10, the apparatus cyclically changes its configuration. During these changes, considerable forces are generated by the rods, and these forces are then converted into an electrical current by generator 44. In one embodiment, the electrical current thus generated passes through a conductor 50 to a remote location. Conductor 50 can be attached to or incorporated into cable 48. In another embodiment, an energy storage device such as a battery may be provided either on frame 12, or on the sea bottom. The battery can be charged by the current from generator 44. In another embodiment, a plant can be located in situ atop rod 36. The plant causes electrical or other energy created by device 10 to provide visual signaling, communications, desalination and other useful applications.

Device 10 can be used in a number of different ways. While it could be used near the shore line of the sea, preferably it should be installed in open sea where it is less obstructive, wave motion is more pronounced, and the distance from shore make it esthetically more acceptable. Moreover, it is well known that waves hitting a shore or beach are much more chaotic and destructive then in the open sea.

In the embodiment shown in FIGS. 1 and 2 the apparatus 10 is provided with a single articulate frame 12. The energy derived from this apparatus is dependent on a number of factors, including the geographic location where the apparatus is placed and which dictates the physical characteristics of the waves, as well as the dimensions of the apparatus in relation to these characteristics. This includes, for example, the spacing between the pivot points 22 and 24.

Figure 3:
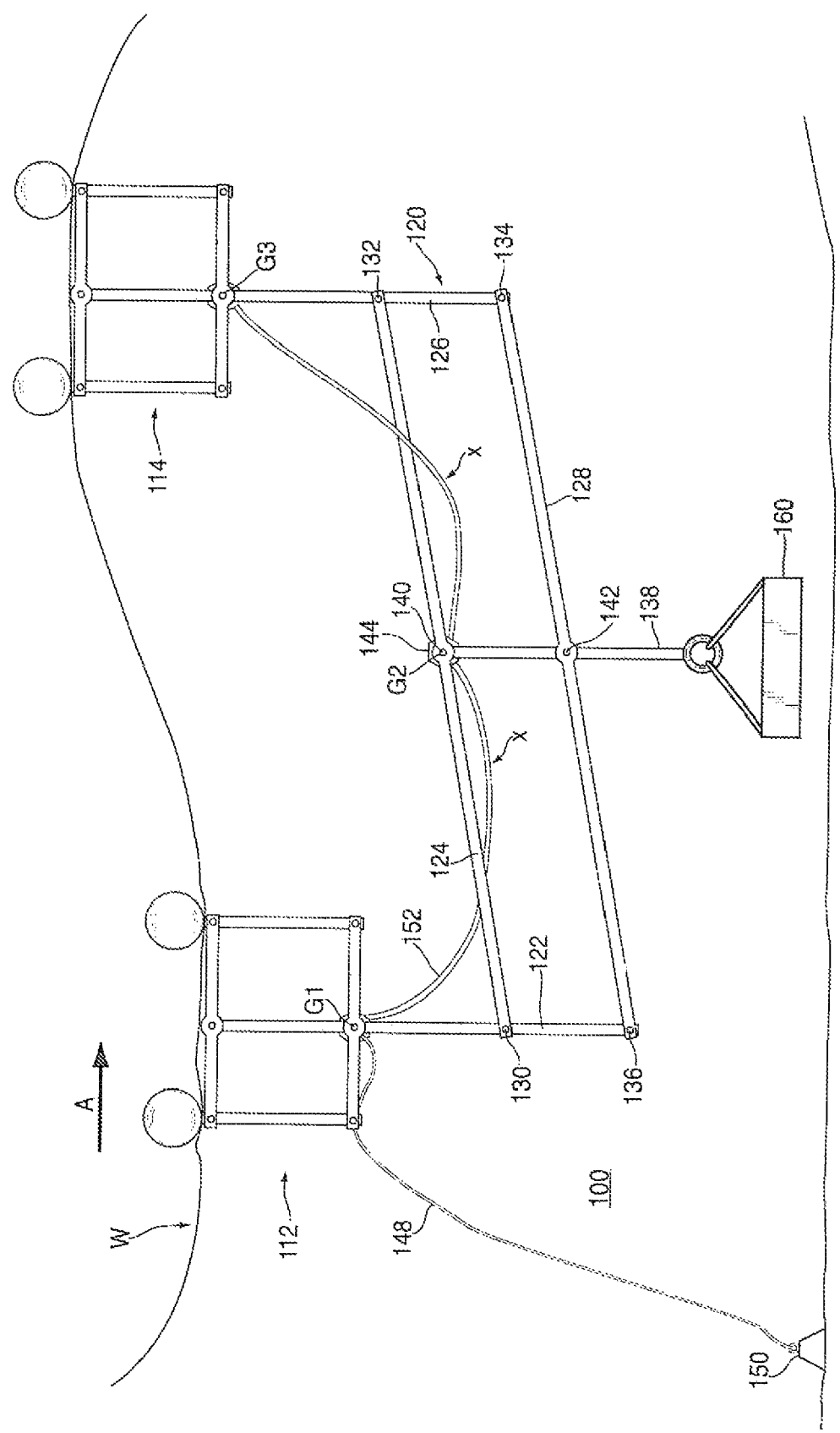
FIG. 3 shows an elevational view of another embodiment of the invention in which two small frames are combined with one larger.

In another embodiment, a composite apparatus is shown with several frames. More particularly, in FIG. 3, an apparatus 100 is shown having two articulate frames 112 and 114. These frames are similar to frame 12 in FIGS. 1 and 2 with the main exception being that they may not need weight 38. In addition, apparatus 100 further includes a third frame 120 formed of rods 122, 124, 126 and 128 interconnected by pivot points 130, 132, 134 and 136. As shown in FIG. 3, vertical rod 122 extends upwardly above pivot point 130 to become the central rod for frame 112. Similarly, rod 126 rises upward above pivot point 132 and becomes the central rod for frame 114.

Frame 120 has its own central rod 138 connected to rod 128 by pivot point 142 and to rod 124 by pivot point 140. A generator 144 is disposed at pivot point 140 (or at 142 or both). Weight 160 is disposed at the bottom of rod 138 and provides a stabilizing force for all three frames 112, 114, 120. The frame 112 is securely tethered by cable 148 to anchor 150. The combined frames 112, 114, 120 can also be similarly tethered to the seabed with a tether from pivot point 136 to anchor 150 or any other point on frames 112 and 120. An electrical cable with several electrical conductors runs between the generators of the frames.

The apparatus of FIG. 3 works as follows. As in FIG. 2, a wind blows in direction A causing a wave of water to travel in the same direction. This wave causes the water level to rise and fall in the vicinity of the frames 112, 114 and the frames use these local phenomena to generate electrical energy, as described above. In addition, the length of rods 124 and 128 is selected so that it is equal to a fraction of an optimal average wavelength of expected waves. (The wavelength of the waves changes for different geographic locations, weather conditions, tides, etc., so the length of the rods 124, 128 may have to be adjusted based on these variables.) Therefore frame 120 captures energy of the full wave. When waves are shorter, rods 124, 128 will tend to rotate less as the horizontal rods of 112 and 114 will rotate more.

The apparatus shown in FIGS. 1-3 can be used alone. However, it may be much more efficient to have several such devices operate in tandem. FIGS. 4a, 4b show a plurality of apparatus 10 connected and spaced apart from each other and operating in tandem. In FIG. 4a the wave lengths are longer than in FIG. 4b and given the horizontal length of the frames the apparatuses of FIG. 4a generate more power than the apparatuses of FIG. 4b. FIGS. 5a, 5b show a plurality of apparatuses 100 connected and spread from each other and operating in tandem. (The anchors, electrical conductors and supporting cables have been omitted for the sake of clarity.) By connecting multiple apparatuses 100 in tandem, energy is captured efficiently in both conditions of long and short waves.

Figure 6:
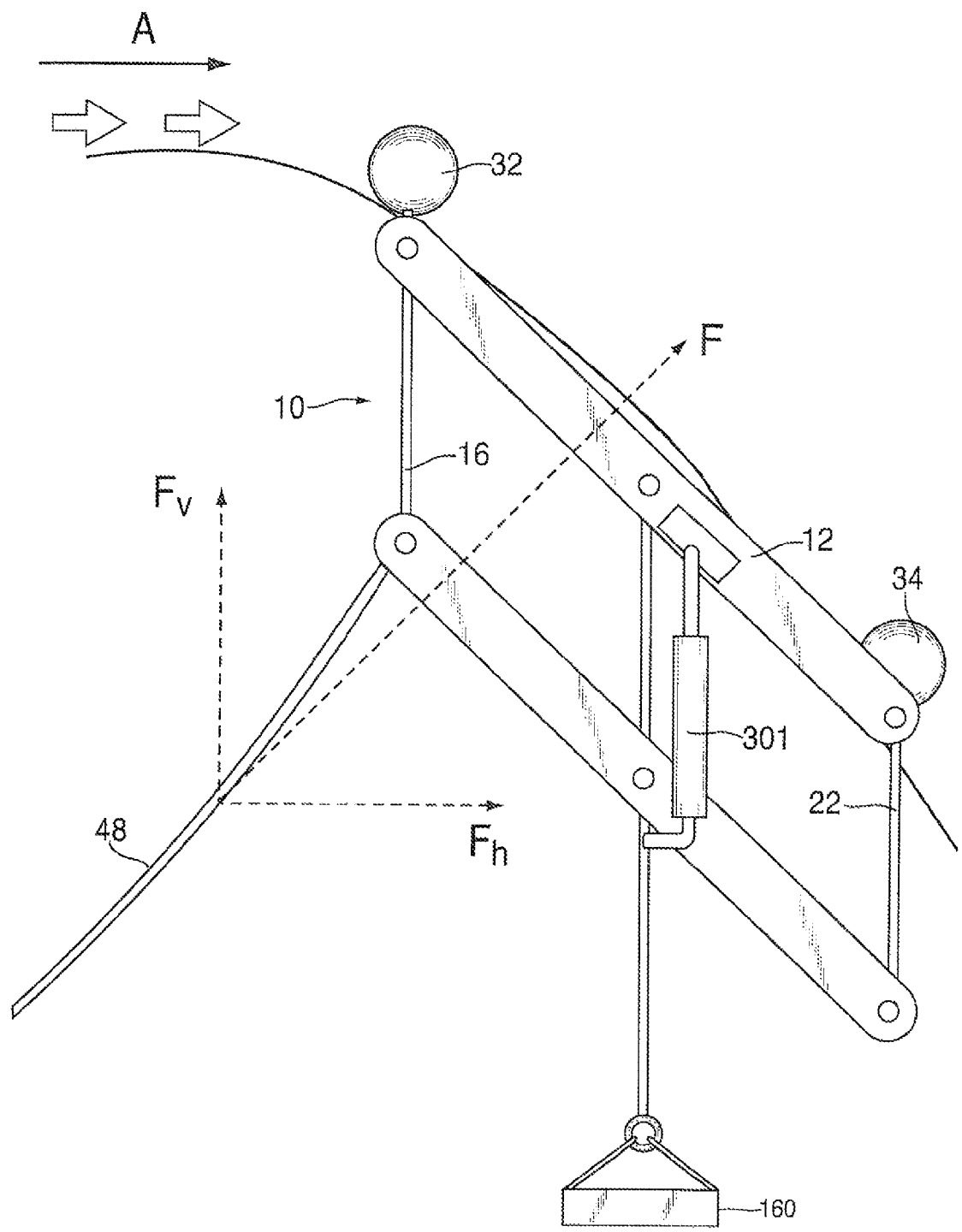
FIG. 6 shows an elevational view of another alternate embodiment of the invention.

One feature of the present invention is that the apparatus is not affected by horizontal movement and it operates more reliably than other devices while only requiring a single non-rigid anchoring cable. This feature is illustrated in FIG. 6 showing an enlarged view of apparatus 10. As can be seen from this Figure, the apparatus 10 applies a force F on cable 48 which is resolved into a vertical component Fv and a horizontal component Fh. The vertical component Fv is equal to the total weight of apparatus 10 less the buoyant force generated by spheres 32, 34 and the weight of the water displaced by the submerged components of the apparatus. This force is part of the forces that cause rods 16, 22 to move up and down as a wave passes the device.

In all prior art devices, horizontal force Fh, as well as the horizontal forces generated by the wave itself, tend to interfere with the generation of energy. However, in the present invention, frame 12 restricts the motion of the vertical rods to the vertical direction and intrinsically resists the horizontal forces, including Fh.

Another advantage of the invention is that the frames are automatically and dynamically aligned in the direction A by the movement of the waves.

The enlarged view provided by FIG. 6 allows for a more detailed depiction of a possible pump for generating water motion and pressure that can generate electrical power by activating a generator 301.

Figure 7:
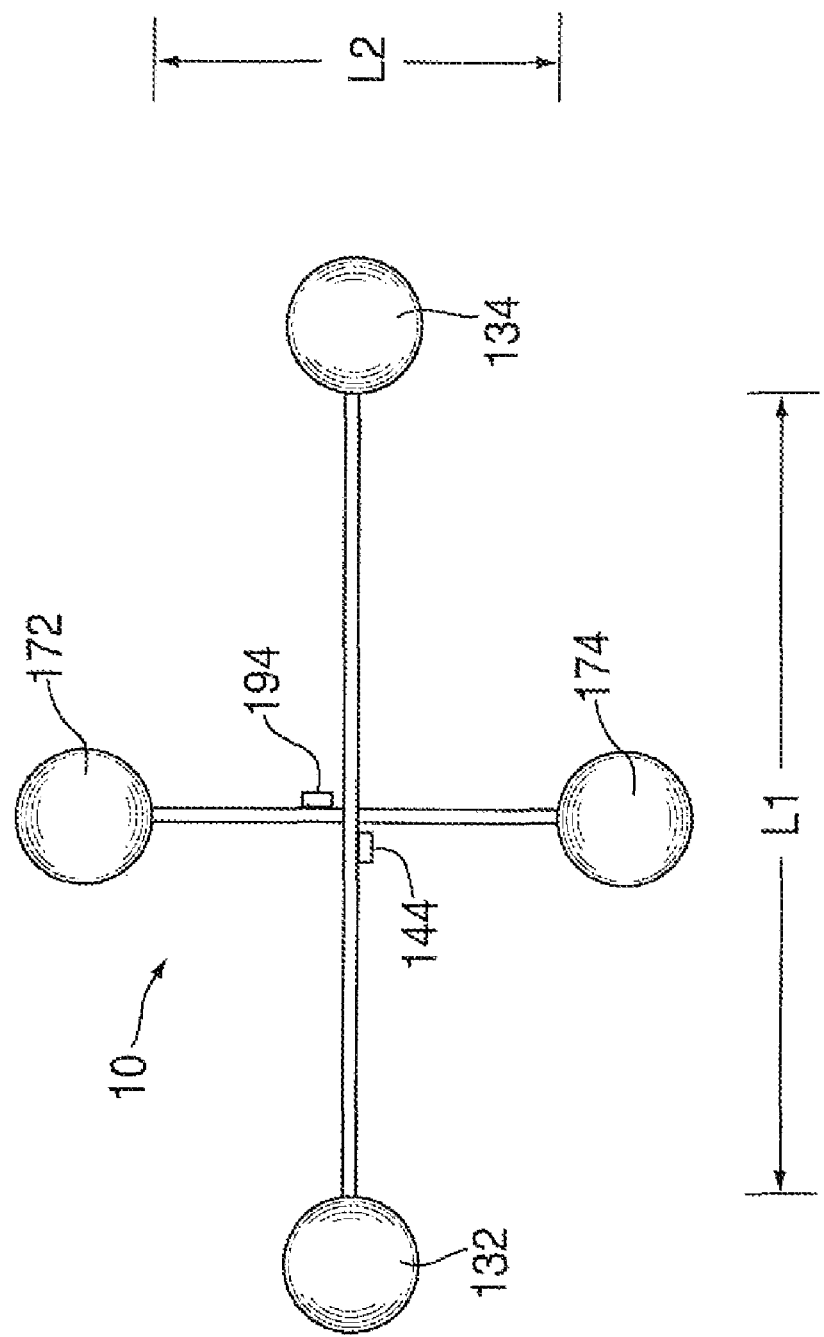
FIG. 7 shows a plan view of another embodiment in which two frames, similar to the frames of FIGS. 1 and 2, but one frame being much longer then the other, are interconnected at right angles.
Figure 8:
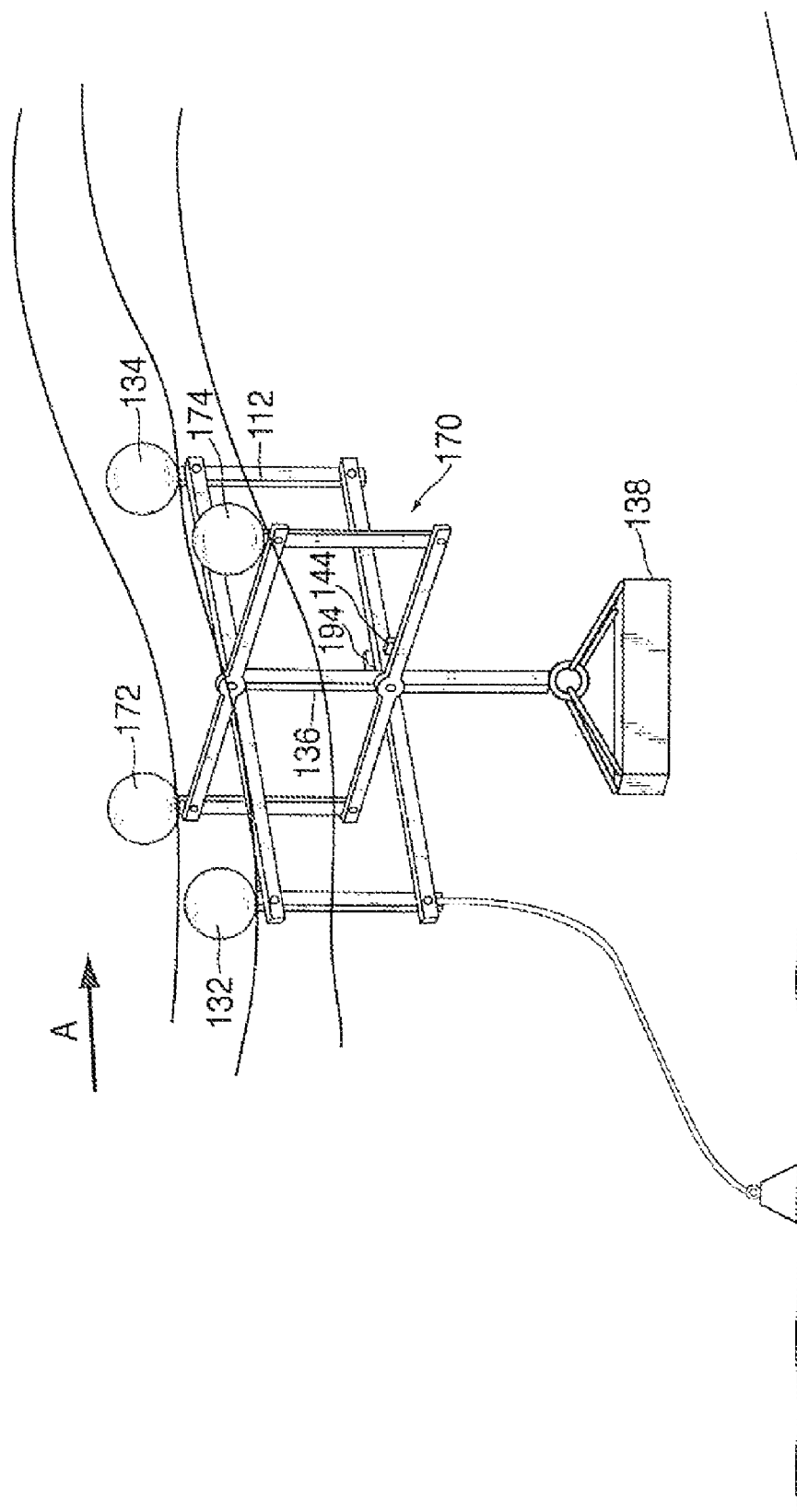
FIG. 8 shows an orthogonal view an arrangement similar to the one in FIG. 7 but with the two frames being the same size.

In the embodiments described above an apparatus is described that is reciprocated in a plane that is generally vertical and parallel to the movement of the waves. In other embodiments, an apparatus is provided that has two sets of frames moving in two different vertical planes, one set being parallel to the wave motion and another set moving in a plane perpendicular to the wave motion. Two such embodiments are shown in FIGS. 7 and 8. In FIG. 7, an apparatus with two frames are shown, with one frame having spheres 132, 134 spaced at one distance L1 by respective rods and the second frame having spheres 172,174 spaced at a distance L2 much smaller than L1. In the embodiment of FIG. 8, an apparatus is shown in a three dimensional view having two frames having the same size.

In both embodiments, as shown in FIG. 8, the two frames share a vertical bar 136 and weight 138 but otherwise they are hingedly connected to each other so that the spheres of one frame can move up and down independently of the spheres of the other frame. Each frame has its own generator 144, 194.

Figure 9:
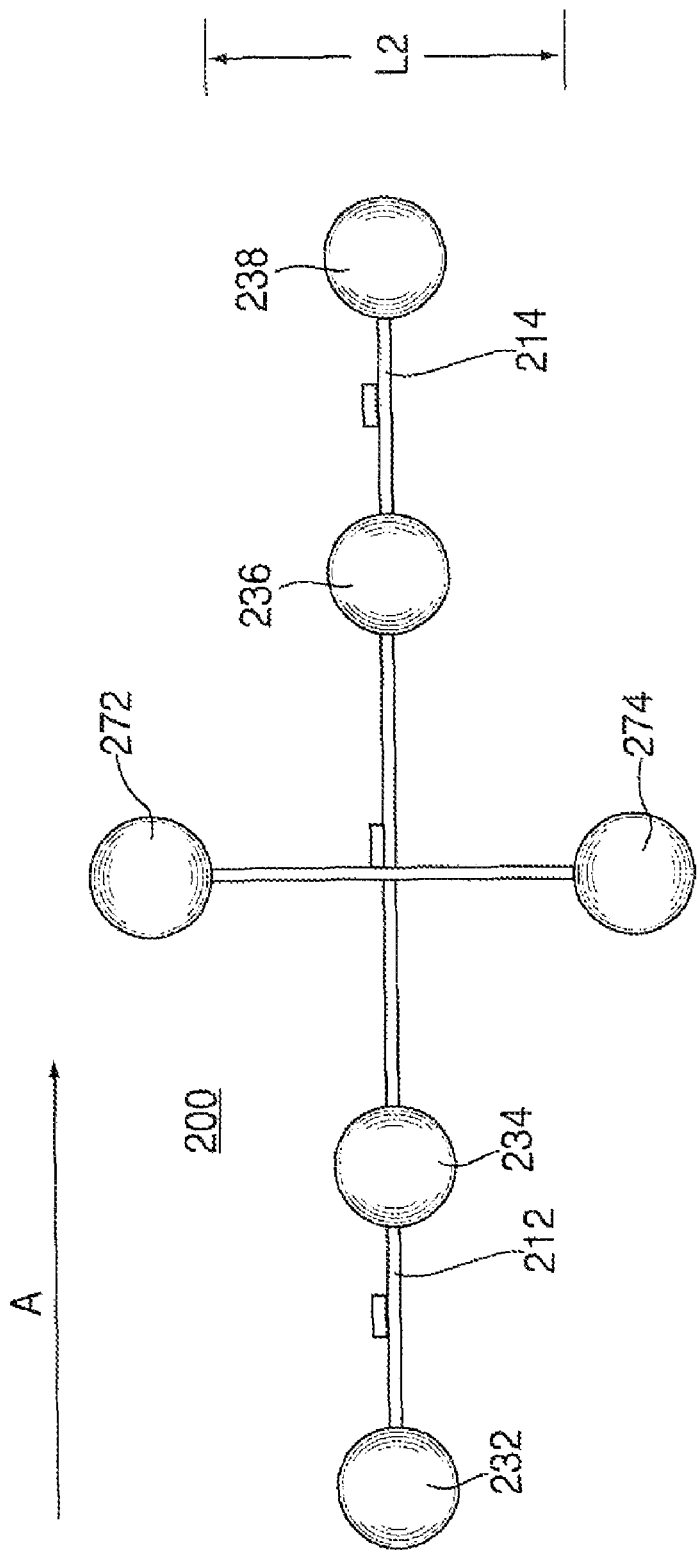
FIG. 9 shows a plan view of another embodiment with a large frame oriented along the wave motion similar to the one in FIG. 3, and a small frame oriented perpendicular thereto.
Figure 10:
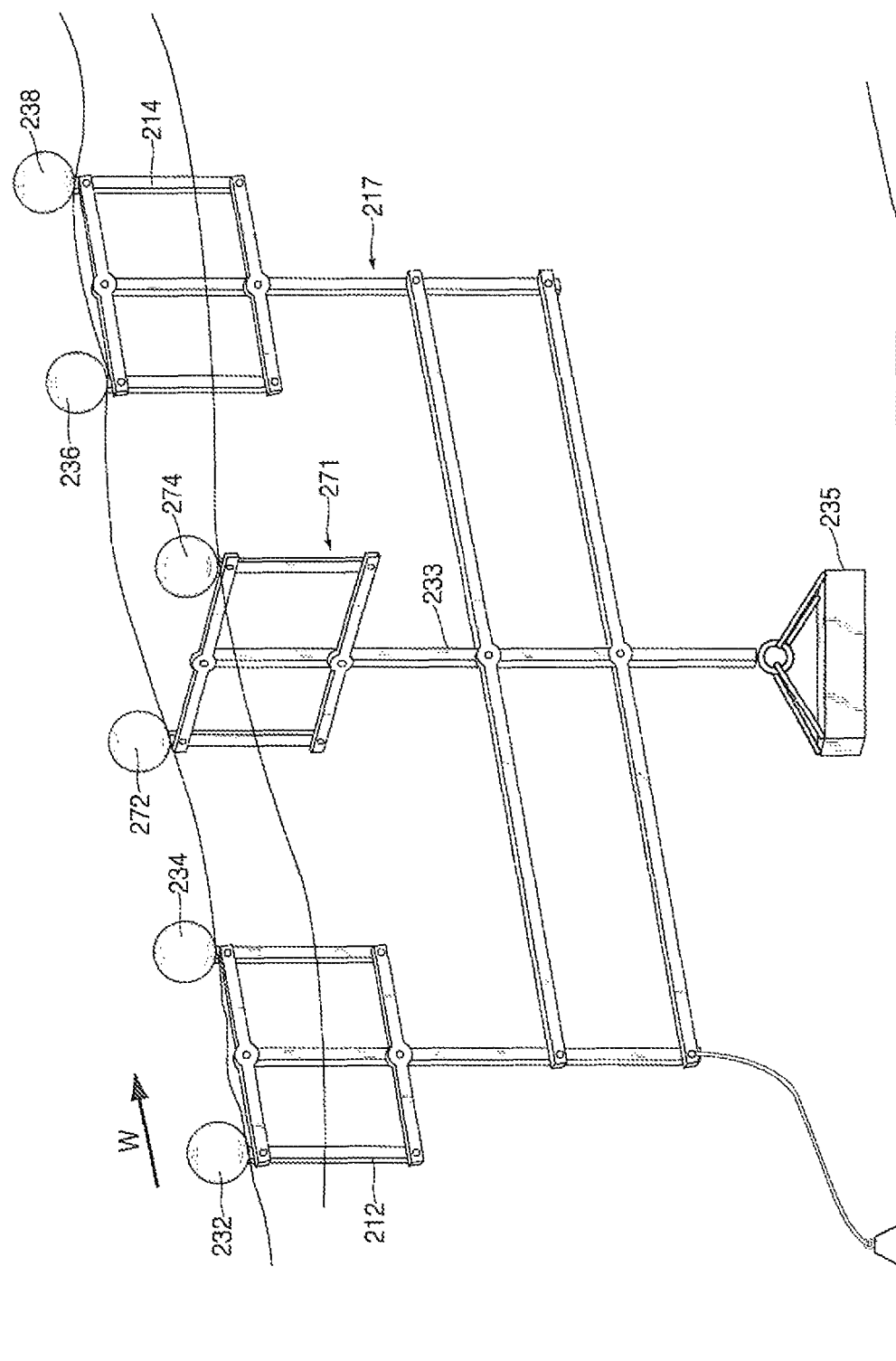
FIG. 10 shows an orthogonal view of the embodiment of FIG. 9.

In the embodiment of FIG. 7, the frame with spheres 132, 134 is arranged so that it is powered by the longitudinal motion of the waves in direction A, and therefore its length L1 related to the expected wavelength of the waves as discussed. The frame with spheres 172, 174 has a length L2 that is somewhat shorter than L1 and is powered by transversal changes in the water level as the waves pass, if any, and otherwise provides a stabilizing of roll motion In the embodiment of FIGS. 9 and 10, an apparatus 200 is shown with two small frames 212, 214 supported by balls 232, 234, 236, 238. The frames are attached to form a large frame 217 similar to the structure in FIG. 3. Another small frame 271 is supported by balls 272 and 274. Small frame 271 and large frame 217 share a common vertical rod 233 and a common weight 235. The other elements of the frames are similar to the elements of FIGS. 1, 2, 3 and have been omitted for the sake of clarity.

In the embodiments of FIGS. 7-10, the small frames not only stabilize the other longitudinal frames, but also provide for the capture of yet more energy as discussed.

Obviously numerous modifications can be made to the invention without departing from its scope as defined in the appended claims. For example, while all embodiments show at least two balls providing buoyancy, structures could be made that require only one such ball or equivalent.

I claim:

1. An apparatus for generating energy from water waves comprising:
    an articulate frame having sides forming a parallelogram;
    at least one buoyant member attached to said frame;
    a weight attached to said frame and cooperating with said buoyant member to keep said frame generally vertical in water; and
    a generator coupled to said frame,
    wherein said frame is cyclically angularly distorted as waves pass said frame in water; and
    wherein said generator is arranged to convert the cyclical distortion of said frame into electrical energy.

2. The apparatus of claim 1, wherein said frame includes two generally vertical rods interconnected by two other rods at end pivoting points.

3. The apparatus of claim 2, wherein said buoyant member is connected to each of said end pivoting points.

4. The apparatus of claim 2, further comprising a central rod disposed generally vertically and connected to an intermediate pivot point on one of said other rods.

5. The apparatus of claim 4, wherein said frame includes a first intermediate pivot point and a second intermediate pivot point provided on said other rods respectively and said central rod extends between said intermediate pivot points.

6. The apparatus of claim 5, wherein said central rod extends below said frame and said weight is attached to said central rod.

7. The apparatus of claim 5, wherein said central rod and said other rods pivot angularly with respect to each other as said frame is distorted and wherein said generator is coupled between or among one of said other rods and said central rod to convert their respective pivoting into electrical or other form of energy.

8. An apparatus converting the motion of water waves into corresponding electrical or other form of energy, comprising:
    a frame having two vertical rods and two other rods, said rods being interconnected at respective pivoting points to form a parallelogram, said frame being cyclically distorted by having the angles between the rods reciprocate as water waves pass said frame; and a generator arranged to transform the distortion of said frame into useable energy.

9. The apparatus of claim 8, further comprising a first buoyant member and a weight, said first buoyant member and said weight cooperating to maintain said frame in a vertical position as waves pass said frame.

10. The apparatus of claim 9, further comprising another buoyant member, said first and said another buoyant members being coupled to a respective pivot point.

11. The apparatus of claim 9, further comprising a central rod connected at intermediate pivot points to said other rods.

12. The apparatus of claim 11, wherein said weight is coupled to said central rod.

13. The apparatus of claim 12, wherein said generator is responsive to cyclical angular changes between said central rod and one of said other rods.

14. The apparatus of claim 8, wherein said generator includes a first generator and a second generator, and wherein said frame includes a first frame and a second frame, each being associated with said first generator and said second generator, respectively, said first and second frames being interconnected at an angle with respect to each other.

15. A composite apparatus for converting wave motion into energy comprising:

a first small articulate frame, a second small articulate frame and a large articulate frame, each articulate frame having two vertical and two horizontal rods interconnected at pivoting points and forming a parallelogram in a largely vertical plane, said horizontal rods of said large frame being much longer than said horizontal rods of said small frames, said small frames being coupled to respective pivot points of said large frame;

at least one buoyant element attached to one of said small frames;

a weight attached to said large frame and cooperating with said buoyant element to maintain said articulate frames essentially just below the water surface as waves pass said frames; and a generator coupled to at least one of said rods and pivot points, wherein waves passing said frames cause said frames to distort by rotating said rods cyclically toward and way from each other; and wherein said generator is constructed and arranged to convert the cyclical rotation of one of said rods and pivot points into useable energy.

16. The apparatus of claim 15, wherein said horizontal rods of said large articulate frame have a length approximately equal to an optimal fraction of the expected wavelength of the waves.

17. The apparatus of claim 16, wherein each frame further includes a respective central rod connected to at least one intermediate pivot point located on one of the horizontal rods; and wherein said small frames are attached to said large frame by the respective central rods.

18. The apparatus of claim 17, wherein said central rod of said large frame is connected to said weight.

19. The apparatus of claim 16, further comprising a cable connecting one of said frames to an anchor point.

20. The apparatus of claim 15, further comprising a third small frame disposed perpendicularly to said large frame.

* * * * *